(12) United States Patent
Cane et al.

(10) Patent No.: US 12,093,909 B2
(45) Date of Patent: Sep. 17, 2024

(54) PAYMENT NETWORK TRANSACTION SCHEDULER

(71) Applicant: American Express Travel Related Services Company, Inc., New York, NY (US)

(72) Inventors: Benjamin J. Cane, Phoenix, AZ (US); Sunil Patel, Phoenix, AZ (US); Prakasam Duraisamy, Phoenix, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 0 days.

(21) Appl. No.: 18/101,046

(22) Filed: Jan. 24, 2023

(65) Prior Publication Data

US 2024/0249256 A1 Jul. 25, 2024

(51) Int. Cl.
*G06Q 20/10* (2012.01)
*G06Q 20/38* (2012.01)

(52) U.S. Cl.
CPC .......... *G06Q 20/10* (2013.01); *G06Q 20/38* (2013.01)

(58) Field of Classification Search
CPC .............................. G06Q 20/10; G06Q 20/38
USPC ........................................................ 705/39
See application file for complete search history.

(56) References Cited

U.S. PATENT DOCUMENTS

| | | | | |
|---|---|---|---|---|
| 7,487,126 B2* | 2/2009 | Kwan | .................... | G06Q 40/00 705/35 |
| 8,781,965 B2* | 7/2014 | Huster | ................. | G06Q 20/327 705/44 |
| 10,382,882 B2* | 8/2019 | Mac Nair | ............ | G06Q 20/405 |
| 11,410,164 B1 | 8/2022 | Chheda et al. | | |
| 11,687,903 B2* | 6/2023 | Pinto | ...................... | G06Q 20/20 705/38 |
| 11,775,977 B1* | 10/2023 | Kruse | ................ | G06Q 20/4014 705/40 |

(Continued)

OTHER PUBLICATIONS

Wilcox, "It's time for you card portfolio check-up", Credit Union Times AL< Media Properties, LLC., Proquest Document Id: 2312953351, Nov. 8 (Year: 2019).*

(Continued)

*Primary Examiner* — Frantzy Poinvil
(74) *Attorney, Agent, or Firm* — Thomas | Horstemeyer, LLP

(57) ABSTRACT

Disclosed are various embodiments for implementing scheduled transactions within a payment network. A computing device first determines that a trigger has occurred for a scheduled transaction for a first payment network. Then, the computing device identifies a network identifier for the recipient and a participant identifier for a recipient of the scheduled transaction. Next, the computing device determines, based at least in part on the network identifier, that the recipient of the scheduled transaction is associated with a second payment network. Subsequently, the computing device generates a payment request representing the scheduled transaction, the payment request comprising the network identifier for the recipient and the participant identifier for the recipient. Then, the computing device forwards the payment request to a global transaction router of a supernetwork.

20 Claims, 7 Drawing Sheets

(56) References Cited

U.S. PATENT DOCUMENTS

| | | | |
|---|---|---|---|
| 11,790,373 B2* | 10/2023 | Piparsaniya | G06Q 20/405 705/41 |
| 2008/0215472 A1* | 9/2008 | Brown | G06Q 20/40 709/206 |
| 2010/0299230 A1* | 11/2010 | Patterson | G06Q 20/10 705/30 |
| 2012/0066062 A1* | 3/2012 | Yoder | G06Q 30/0253 705/14.51 |
| 2013/0103584 A1* | 4/2013 | Eichner | G06Q 20/12 705/44 |
| 2020/0167773 A1 | 5/2020 | Cervenka et al. | |
| 2021/0182810 A1 | 6/2021 | Johnston et al. | |

OTHER PUBLICATIONS

"Charge Anywhere provides notice of payment card incident", US NewsWire, Washington, ProQuest Document Id: 1634487006, Dec. 9 (Year: 2014).*

* cited by examiner

PAYMENT NETWORK TRANSACTION SCHEDULER

BACKGROUND

Financial institutions use payment networks to send funds to other participating financial institutions. Financial institutions may also be members of other types of payment networks. Moreover, financial institutions may be members of multiple payment networks to offer multiple payment options to customers and to increase the ability of the financial institution to make electronic payments to other financial institutions.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for connecting and facilitating payments between different payment networks. Financial institutions are often members of payment networks in order to allow payments between the financial institutions. Generally, as long as two financial institutions are members of the same payment network, they can make payments with each other.

However, there are multiple payment networks currently available. If two financial institutions are not members of the same payment network, then they cannot make a payment with each other. This can happen when multiple payment networks are available within the same jurisdiction (e.g., FedNow and THE CLEARING HOUSE in the United States for real-time payment networks; AMERICAN EXPRESS, MASTERCARD, or VISA credit card networks; etc.) or when financial institutions are located in different jurisdictions that provide different payment networks due to regulatory differences and oversight. Accordingly, the various embodiments of the present disclosure solve the problem that occurs when a first financial institution that is a member of a payment network wants to make a payment to a second financial institution that is not a member of the payment network.

Many financial institutions also allow for account holders to schedule transactions in advance. These can include recurring payments (e.g., payroll, rent, utility bills, etc.) or one-time payments due in the future. However, each financial institution would need to create their own payment scheduler, which is generally only available to their own customers or users. Moreover, individual financial institutions may not support schedule payments for each payment network or payment rail that the financial institution is a member of or is connected to.

To solve these problems, various embodiments of the present disclosure facilitate the payment of funds using a payment scheduler hosted by the payment network itself. In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
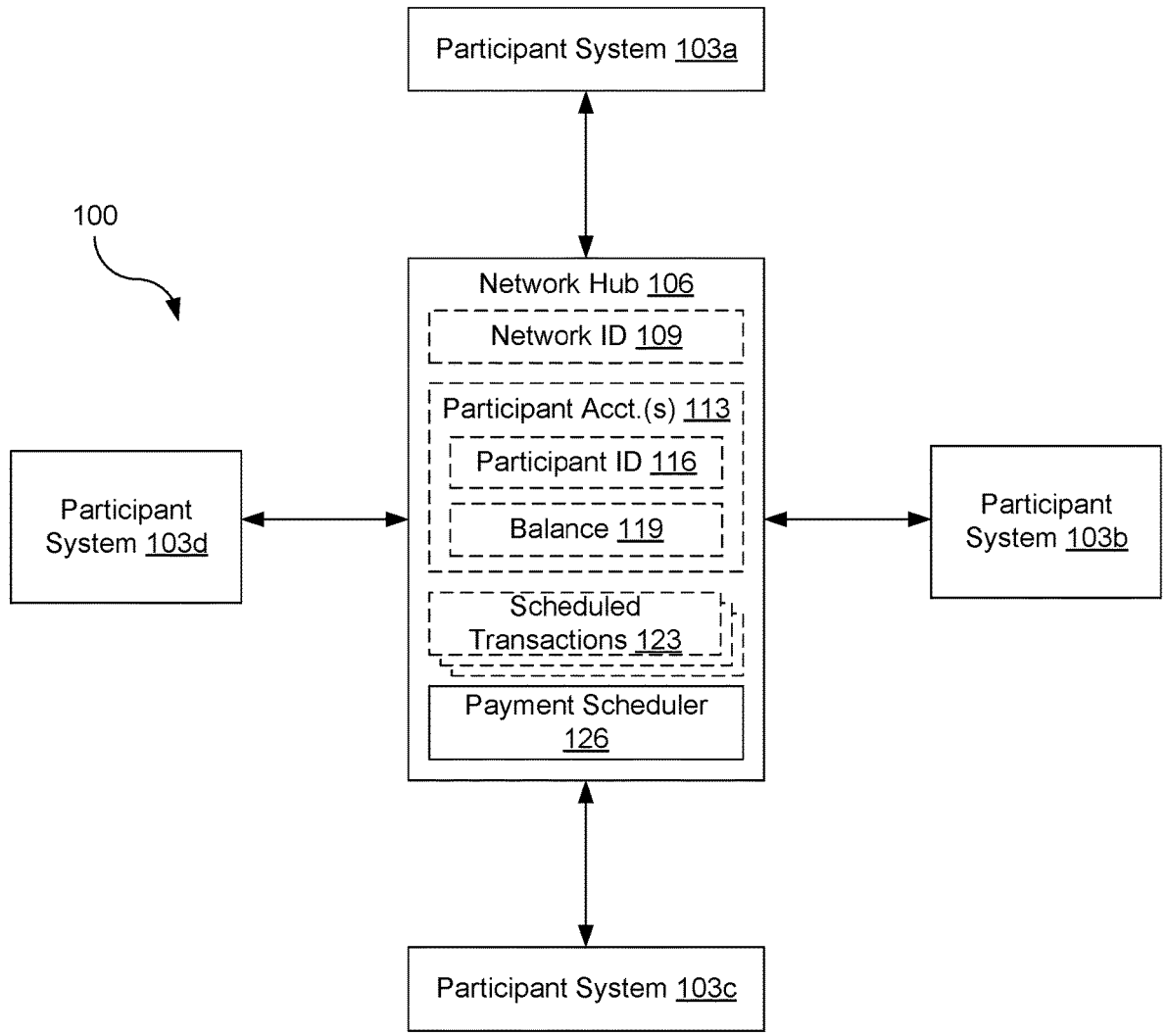
FIG. 1 is a drawing depicting a payment network according to various embodiments of the present disclosure.

FIG. 1 is a schematic block diagram depicting an example of a payment network 100. A payment network 100 is payment rail or payment network that allows member institutions to make payments to each other. Examples of payment networks 100 include real-time payment networks, credit card networks (e.g., MASTERCARD, VISA, or AMERICAN EXPRESS networks), debit card networks, net settlement networks (e.g., AUTOMATED CLEARINGHOUSE (ACH)), gross settlement networks, wire transfer networks (e.g., WESTERN UNION, SWIFT, CHIPS, FEDWIRE, etc.), as well as other types of networks.

Real-time payment networks are payment networks 100 that provide immediate availability for making payments at any time, in contrast to other payment rails or networks where payments may be take several days to process and/or may only be made or processed on specific days or hours (e.g., only on business days and/or only during business hours). Examples of real-time payment networks in the United States are THE CLEARING HOUSE RTP network offered by The Clearing House and the FEDNOW RTP network offered by the Federal Reserve. Other payment networks 100 may be available in other jurisdictions.

The payment network 100 can have a number of components, such as one or more participant systems 103 (e.g., participant system 103a, participant system 103b, participant system 103c, participant system 103d, etc.) and a network hub 106. Participant systems 103 represent systems owned or operated by members of the payment network 100, such as banks or other financial institutions that use the payment network 100 to send and receive payments. The network hub 106 can represent one or more computing systems and software services that receive and reconcile payment requests from participant systems 103.

Figure 2:
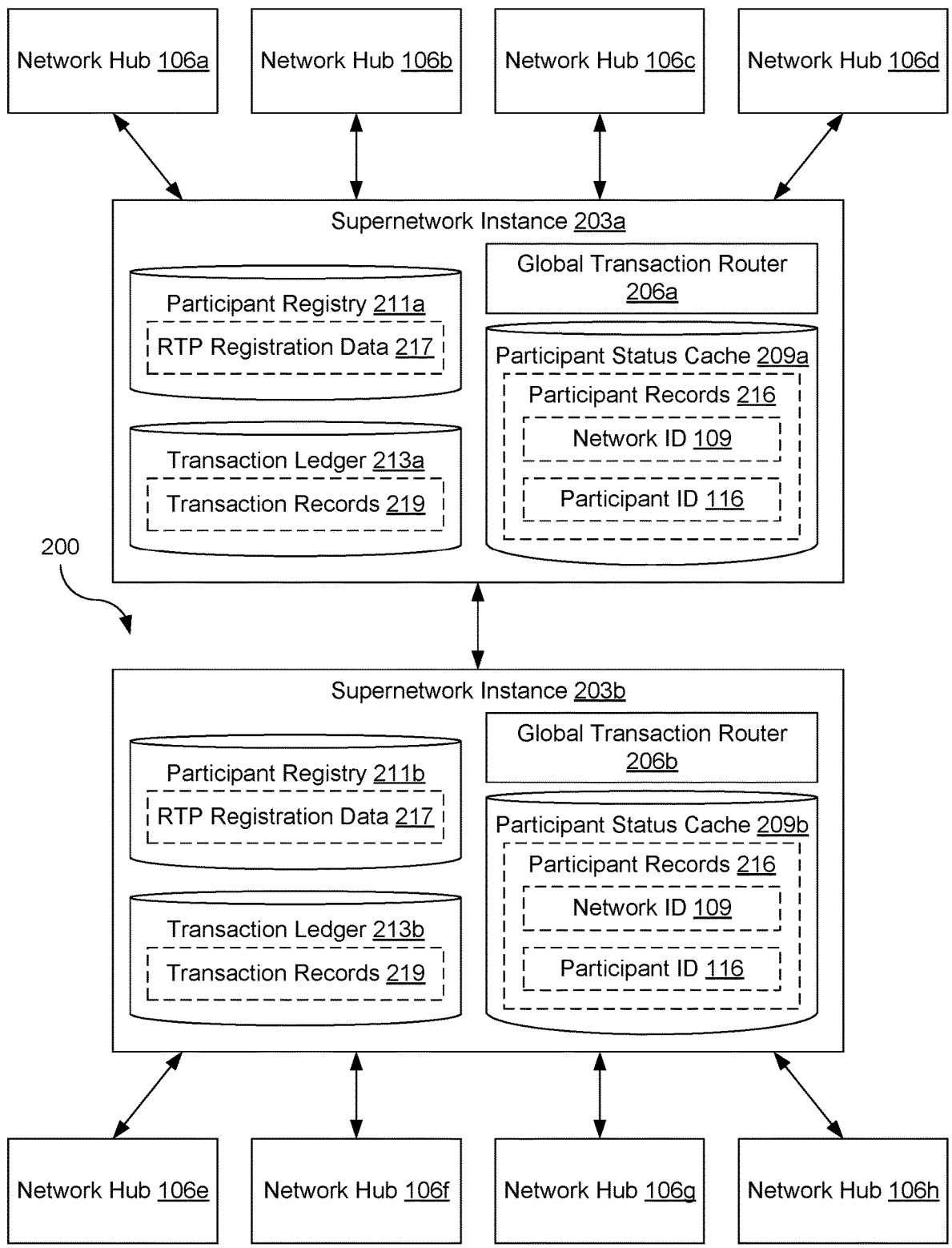
FIG. 2 is a drawing of a supernetwork according to various embodiments of the present disclosure.

Accordingly, the network hub 106 can store various data to allow it to facilitate payments from one network participant 103 to another network participant 103, as well as route payments from a network participant 103 of the payment network 100 to another network participant 103 of another payment network 100 using a supernetwork 200 (FIG. 2).

This data could include a network identifier 109 and one or more participant accounts 113.

The network identifier 109 can represent any identifier that uniquely identifies a payment network 100 with respect to another payment network 100. The network identifier 109 can be used by the supernetwork 200 to identify or distinguish between individual payment networks 100 when routing payments between payment networks 100.

Participant accounts 113 can be used by the network hub 106 to track the amount of funds each participant system 103 has on deposit with the payment network 100. Accordingly, each participant system 103 of a participant can be associated with a participant account 113. A participant account 113 can include information such as a participant identifier 116 and a balance 119. The participant identifier 116 can be any identifier that uniquely identifies a participant system 103, and therefore a participant, with respect to another participant system 103, and therefore another participant. Examples of participant identifiers 116 can include American Banker Association (ABA) routing transit numbers, Bank Identifier Codes (BICs), the prefix used for international bank account numbers (IBANS), or payment network 100 specific participant identifiers 116. The balance 119 can represent the amount of funds available in the participant account 113 to a respective participant. When a payment request is sent by a first participant system 103, the amount of the balance 119 in the participant account 113 associated with the first participant system 103 is reduced by the amount specified in the payment request. Meanwhile, the amount of the balance 119 in the participant account 113 of the second, recipient participant system 103 is increased by the amount specified in the payment request.

The network hub 106 can also store one or more scheduled transactions 123, which could be managed by a payment scheduler 126. In some implementations, such as those where there are multiple instances of a network hub 106 within the payment network 100, the scheduled transactions 123 could be stored in a distributed, eventually consistent data store. In these implementations, the payment scheduler 126 could be implemented as a distributed scheduler.

A scheduled transaction 123 can represent a transaction to be processed at specified point in the future. Accordingly, a scheduled transaction 123 can include a schedule that specified the date, time, and/or frequency that a transaction should be processed. A scheduled transaction 123 can also include transaction information, such as the amount of the transaction; the account number, participant identifier 116 and/or network identifier 109 of the payor; the account number, participant identifier 116, and/or network identifier 109 of the payee; and any authorization tokens or similar data to indicate that the scheduled transaction 123 has been previously authorized.

The payment scheduler 126 can be executed to manage, facilitate, and execute scheduled transactions 123 according to various embodiments of the present disclosure. For example, the payment scheduler 126 could provide an application programming interface (API) that allows participant systems 103 to create, modify, or delete scheduled transactions 123. The payment scheduler 126 could also identify or otherwise track when a triggering event, as defined or specified in the schedule for a scheduled transaction 123, has occurred. In response, the payment scheduler 126 could then use the transaction information specified in the scheduled transaction 123 to cause the scheduled transaction 123 to be performed.

Moreover, an operator of the supernetwork 200 can also maintain a participant account 113 with the payment network 100. The participant account 113 of the supernetwork 200 can be used by the supernetwork 200 to facilitate payments between members of the payment network 100 and members of other payment networks 100, as described in further detail later.

FIG. 2 is a schematic block diagram depicting an example of a supernetwork 200 according to various embodiments of the present disclosure. The supernetwork 200 can be implemented to route payments between different payment networks 100 (FIG. 2), thereby allowing a participant of a first payment network 100 to make a payment to a participant of a separate, second payment network 100. Accordingly, the supernetwork 200 can include one or more supernetwork instances 203, such as supernetwork instance 203a and supernetwork instance 203b, that form a peer-to-peer network with each other. Each supernetwork instance 203 can be in data communication with one or more network hubs 106, such as network hubs 106a, 106b, 106c, 106, 106e, 106f, 106g, and 106h.

Each supernetwork instance 203 can include a number of components. For example, a super network instance 203 can include a global transaction router 206, a participant status cache 209, a participant registry 211, and a transaction ledger 213. The global transaction router 206 can be executed to route payment requests between network hubs 106 of different payment networks 100 connected to a supernetwork instance 203

The participant status cache 209, participant registry 211, and the transaction ledger 213 are all representative of data stores and associated with the operation of the various applications or functional entities of the various embodiments of the present disclosure. The participant status cache 209, participant registry 211, and the transaction ledger 213 can be implemented as relational databases or non-relational databases such as object-oriented databases, hierarchical databases, hash tables or similar key-value data stores, as well as other data storage applications or data structures. Moreover, combinations of these databases, data storage applications, and/or data structures may be used together to provide a single, logical, data store. In many instances of the present disclosure, participant status cache 209, participant registry 211, and the transaction ledger 213 can be implemented as distributed, eventually consistent data stores in order to synchronize the data across multiple supernetwork instances 203. The participant status cache 209 can include one or more participant records 216. The participant registry 211 can store RTP registration data 217. Meanwhile the transaction ledger 213 can include one or more transaction records 219. Other data can also be stored in the participant status cache 209, participant registry 211, or the transaction ledger 213 as desired by various embodiments of the present disclosure. Moreover, while depicted separately, the data stored in the participant status cache 209, participant registry 211, and the transaction ledger 213 can be combined into one or more data stores in some implementations.

A participant record 216 represents a record of a participant system 103 that is a member of a payment network 100. Each participant record 216 can include the network identifier 109 of the payment network 100 that the participant system 103 is a member of, as well as the participant identifier 116 of the participant system 103 in the payment network 100. If a participant or participant system 103 is a member of or participant in multiple payment networks 100, then the participant or participant system 103 could be associated with multiple participant records 216. Other information can also be included in a participant record 216 as desired for particular implementations of the present disclosure.

RTP registration data 217 includes information about individual payment networks 100 with a network hub 106 connected to a supernetwork instance 203 of the supernetwork. RTP registration data 217 can include a list of network hubs 106 or payment networks 100 and the individual supernetwork instances 203 that the network hubs 106 are connect to or in data communication with. For example, RTP registration data 217 could map a network identifier 109 for a payment network 100 to a particular supernetwork instance 203 (e.g., by using an instance identifier of the supernetwork instance 203). Other information regarding individual payment networks 100 could also be stored in the RTP registration data 217 as desired for individual implementations of the present disclosure.

A transaction record 219 can represent a record of a transaction made between participants of two different payment networks 100 within the supernetwork 200. Information stored in the transaction record 219 can include the participant identifier 116 and network identifier 109 of the payer, the participant identifier 116 and network identifier 109 of the payee, the amount of the transaction, as well as any other information that may be relevant to a particular embodiment of the present disclosure.

Next, a general description of the operation of the various components of the supernetwork 200 is provided. Although the following description provides merely an example of the operation of the supernetwork 200, and the interactions between individual components, other interactions and operations can also be performed by the various embodiments of the present disclosure. More detailed description of the operation of individual components is illustrated in the flowcharts of FIGS. 3-6.

To begin, a network hub 106 of a payment network 100 can be configured to connect to a supernetwork instance 203 of the supernetwork 200. As part of the connection process, the network hub 106 can be configured to send and receive message to the supernetwork instance 203 using a supernetwork compliant message protocol. The network hub 106 could also be configured to translate payment messages from the format of the payment network 100 serviced by the network hub 106 to the supernetwork compliant message protocol, and vice versa. Moreover, during the registration or first connection of the network hub 106 of the payment network 100 with the supernetwork instance 203, the RTP registration data 217 for the payment network 100 could be saved to the participant registry 211. For example, the network identifier 109 for the payment network 100 could be saved in association with an instance identifier of the supernetwork instance 203 that the network hub 106 is connected to. The participant registry 211 could then replicate, distribute, or synchronize the RTP registration data with other participant registries 211 of other supernetwork instances 203.

Subsequently, the network hub 106 could provide a list of all participants in the payment network 100 of the network hub 106 to the global transaction router 206 of the supernetwork instance 203. This could include the network identifier 109 of the payment network 100 of the network hub 106, as well as the participant identifiers 116 of the participant systems 103 of the payment network 100 of the network hub 106. In response, the global transaction router 206 could create and save a participant record 216 for each of the participants of the payment network 100 of the network hub 106 to the participant status cache 209. The participant status cache 209 could then replicate, distribute, or synchronize the newly created participant records 216 to other participant status caches 209 of other supernetwork instances 203.

Later, a network hub 106 of a first payment network 100 (e.g., network hub 106a) could receive a payment request from a participant system 103 to send a payment to a second participant system 103 that is part of a second payment network 100 that uses a second network hub 106 (e.g., network hub 106h). The first network hub 106a could determine that the recipient of the transaction is not a member of the first payment network 100. In response, the first network hub 106a could create and send a payment request to the global transaction router 206a executed by the supernetwork instance 203a that the network hub 106a is connected to.

The global transaction router 206a could evaluate the payment request to determine where to route the payment request. For example, the global transaction router 206a could query the participant status cache 209a to determine whether there is a participant record 216 matching a participant identifier 116 for the recipient. If a participant record 216 exists, the global transaction router 206a could retrieve the network identifier 109 to determine which network hub 106 to route the payment request to. If the network identifier 109 fails to match the network identifier 109 of a network hub 106 connected to the supernetwork instance 203a, then the global transaction router 206a could query the RTP registration data 217 in the participant registry 211a to determine which supernetwork instance 203 (e.g., supernetwork instance 203b) the payment request should be routed to. The global transaction router 206a could then send the payment request to the appropriate global transaction router 206b.

The global transaction router 206b can receive the payment request and evaluate it to determine which network hub 106 to route the payment request to. For example, the global transaction router 206b could compare the network identifier 109 specified in the payment request to the network identifiers 109 of the network hubs 106 connected to the supernetwork instance 203b. If the network identifier 109 in the payment request matches the network identifier 106 of a connected network hub 106, such as network hub 106h, then the global transaction router 206b could forward the payment request to the recipient network hub 106h.

The recipient network hub 106h could return a response message, which either accepts or rejects the payment request, to the global transaction router 206b. The global transaction router 206b could then relay the response message to the global transaction router 206a, and the global transaction router 206a could relay the response message to the source network hub 106a.

Figure 3:
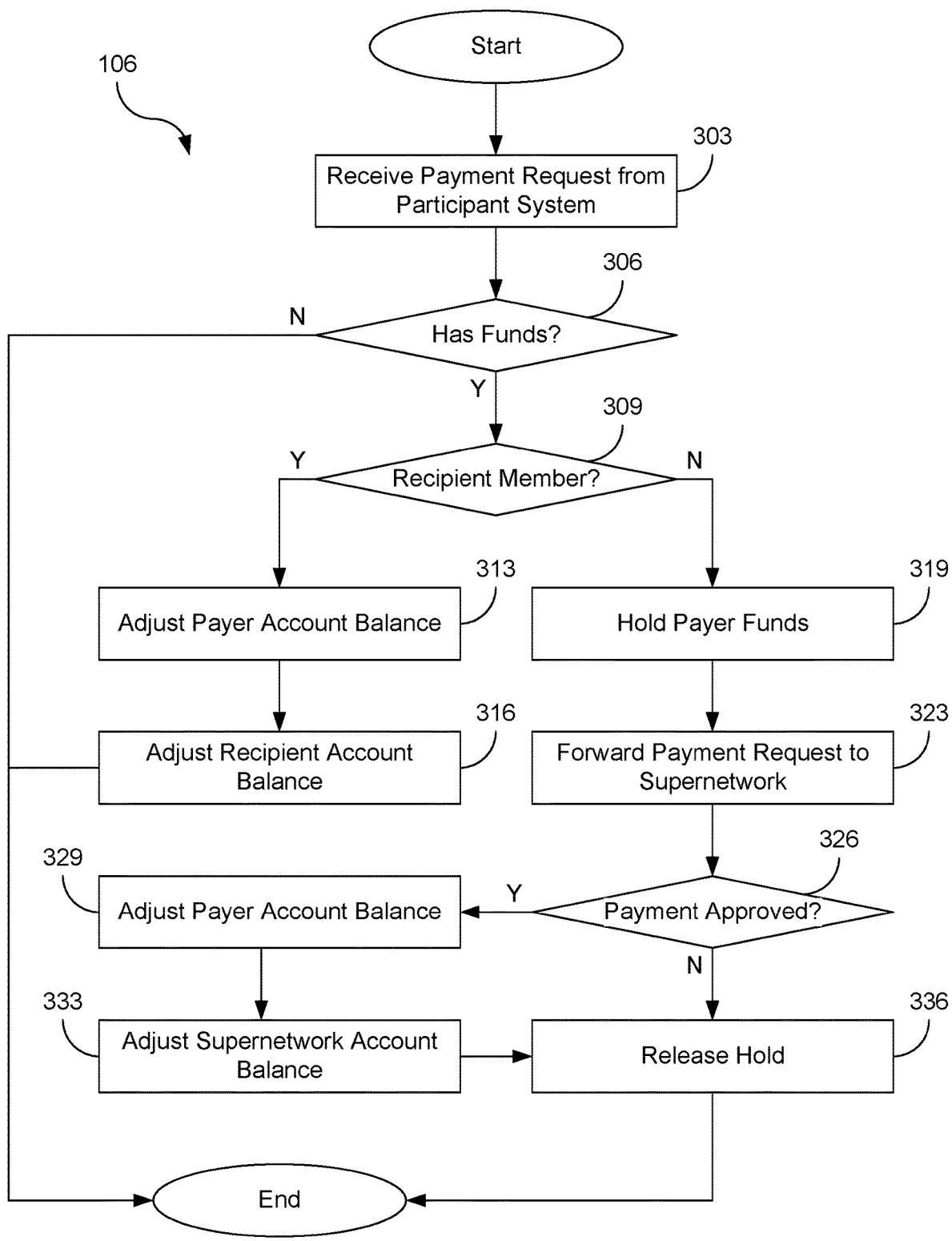
FIG. 3 is a flowchart illustrating one example of functionality implemented as portions of an application executed in a computing environment in the super network of FIG. 2 according to various embodiments of the present disclosure.

Referring next to FIG. 3, shown is a flowchart that provides one example of the operation of a portion of a network hub 106. The flowchart of FIG. 3 provides merely an example of the many different types of functional arrangements that can be employed to implement the operation of the depicted portion of the network hub 106. As an alternative, the flowchart of FIG. 3 can be viewed as depicting an example of elements of a method implemented within the payment network 100 or the supernetwork 200.

Beginning with block 303, the network hub 106 can receive a payment request from a participant system 103. The payment request can include information such as the participant identifier 116 of the recipient, the participant identifier 116 of the payee, the amount of the payment, and potentially other information.

Then, at block 306, the network hub 106 can determine whether the balance 119 of the participant account 113 associated with the participant identifier 116 of the payee that submitted the payment request at block 303 has sufficient funds to settle the payment. If the balance 119 of the participant account 113 has insufficient funds to settle the payment, then the process can end. Optionally, the network hub 106 could send a rejection or error message to the participant system that submitted the payment request. However, if the balance 119 of the participant account 113 has sufficient funds, then the process can proceed to block 309.

Moving on to block 309, the network hub 106 can determine if the recipient identified in the payment request is a participant in the payment network 100. For example, the network hub 106 could search for a participant account 113 with a participant identifier 116 matching the participant identifier 116 specified in the payment request. If a matching participant account 113 is found, then the network hub 106 can determine that the recipient is member of the payment network 100 and the process can proceed to block 313. However, if a matching participant account 113 is not found, then this would indicate that the recipient is not a member of the payment network 100. In this situation, the process could proceed to block 319.

If the process proceeds to block 313, the network hub 106 can adjust the account balance 119 of the participant account 113 of the payer. For example, the network hub 106 could deduct an amount of funds from the account balance 119 equal to the amount of funds specified in the payment request.

Next, at block 316, the network hub 106, can similarly adjust the account balance 119 of the participant account 113 of the recipient. For example, the network hub 106 could add an amount of funds to the account balance 119 of the recipient equal to the amount of funds specified in the payment request.

However, if the process instead proceeds to block 319, the network hub 106 can place a hold on the account balance 119 of the participant account 113 of the payer that submitted the payment request at block 303. This hold can be done to prevent double-spending of funds held in the participant account 113 of the payer while the network hub 106 forwards the payment request to a global transaction router 206 of a supernetwork instance 203.

Then, at block 323, the network hub 106 can forward the payment request to the global transaction router 206 of the supernetwork instance 203 that the network hub 106 is connect to. In some implementations, the network hub 106 could create a new payment message or payment request that satisfies any protocol requirements of the supernetwork 200. Generally, such a new payment message or payment request would include at least the same information that is included in the original payment, but be formatted in a standardized way that could be processed by the global transaction router 206.

Moving on to block 326, the network hub 106 can wait until it receives a payment response message from the global transaction router 206 of the supernetwork instance 203 that the network hub 106 is connected to. Once the payment response message is received, the network hub 106 can analyze the payment response message to determine if the payment request was accepted by the recipient network hub 106 or if the payment request was rejected. If the payment response message indicates that the payment request was accepted, then the process can proceed to block 329. However, if the payment response message indicates that the payment request was rejected, then the process can skip to block 336.

If the process proceeds to block 329, the network hub 106 can adjust the payer account balance 119. For example, the network hub 106 could deduct an amount of funds from the account balance 119 equal to the amount specified in the payment request. In some instances, the payment response message could include additional transaction fees (e.g., transaction fees required by the supernetwork 200 or the recipient network hub 106 to process the payment). In these instances, the additional transaction fees could also be deducted from the account balance 119 of the participant account 113 of the payer.

Next, at block 333, the network hub 106 can adjust the account balance 119 of a participant account 113 associated with the operator of the supernetwork 200. For example, the network hub 106 could add an amount of funds equal to the amount specified in the payment request and any additional transaction fees to the account balance 119 of the participant account 113 of the supernetwork 200.

Once the process proceeds to block 336, the network hub 106 can release the hold on the account balance 119 of the participant account 113 of the payer. Then, the process could end.

Figure 4:
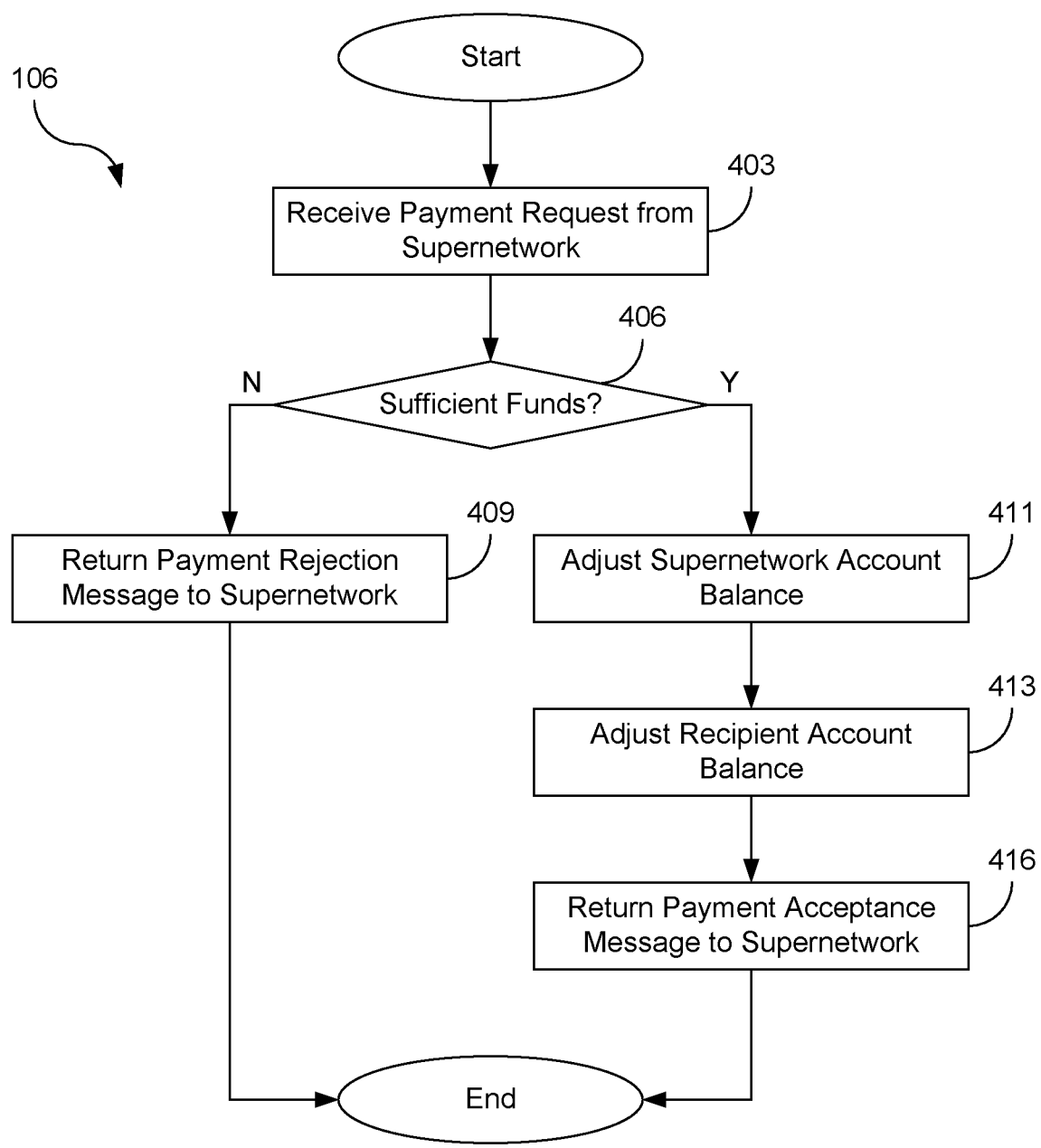
FIG. 4 is a flowchart illustrating one example of functionality implemented as portions of an application executed in a computing environment in the super network of FIG. 2 according to various embodiments of the present disclosure.

Referring next to FIG. 4, shown is a flowchart that provides one example of the operation of a portion of a network hub 106. The flowchart of FIG. 4 provides merely an example of the many different types of functional arrangements that can be employed to implement the operation of the depicted portion of the network hub 106. As an alternative, the flowchart of FIG. 4 can be viewed as depicting an example of elements of a method implemented within the payment network 100 or the supernetwork 200.

Beginning with block 403, a network hub 106 can receive a payment request from a global transaction router 206 of a supernetwork instance 203 connected to the network hub 106. For example, if a first network hub 106*a* forwarded a payment request to the global transaction router 206*a* using the process described in FIG. 3, then a recipient network hub 106 (e.g., network hub 106*h*) could receive a corresponding payment request from the global transaction router 206*b* of the supernetwork instance 203*b*.

Then, at block 406, the network hub 106 can determine whether the account balance 119 of the participant account 113 associated with the operator of the supernetwork 200 has sufficient funds to complete the transaction. If there are insufficient funds (e.g., because the payment request is larger than the current account balance 119 of the supernetwork 200 within the payment network 100), then the process can proceed to block 409. However, if there are sufficient funds to complete the payment request, then the process can proceed to block 411.

If the process proceeds to block 409, then the network hub 106 can generate a payment rejection message and return the payment rejection message to the global transaction router 206 of the supernetwork instance 203 that the network hub 106 is connected to. The payment rejection message can include the participant identifier 116 of the source of the payment and, potentially, the network identifier 109 of the source of the payment. In some instances, the payment rejection message could include a reason why the payment was rejected, while in other instances the reason for the rejection of the payment request could be omitted.

However, if the process proceeds to block 413, then the network hub 106 can adjust the account balance 119 of a participant account 113 associated with the operator of the supernetwork 200. For example, the network hub 106 could deduct an amount of funds equal to the amount specified in the payment request. The network hub 106 could also deduct any additional transaction fees from the account balance 119 of the participant account 113 of the operator of the supernetwork 200 to compensate the payment network 100 operator for the costs of processing the transaction.

Next, at block 413, the network hub 106 can adjust the account balance 119 of the participant account 113 of the recipient. Accordingly, the network hub 106 could search for the participant account 113 matching the participant identifier 116 specified in the payment request. The network hub 106 could then add an amount of funds to the account balance 119 of the matching participant account 113 equal to the amount specified in the payment request.

Subsequently, at block 416, the network hub 106 could generate and return a payment acceptance message to the global transaction router 206 of the supernetwork instance 203 that the network hub 106 is connected to. The payment acceptance message could include information such as a confirmation code or number, a confirmation of the amount deposited to the account balance 119 of the recipient, a timestamp indicating the time at which the recipient received the funds, the participant identifier 116 of the source of the payment and, potentially, the network identifier 109 of the source of the payment, as well as other information. The process can then subsequently end.

Figure 5:
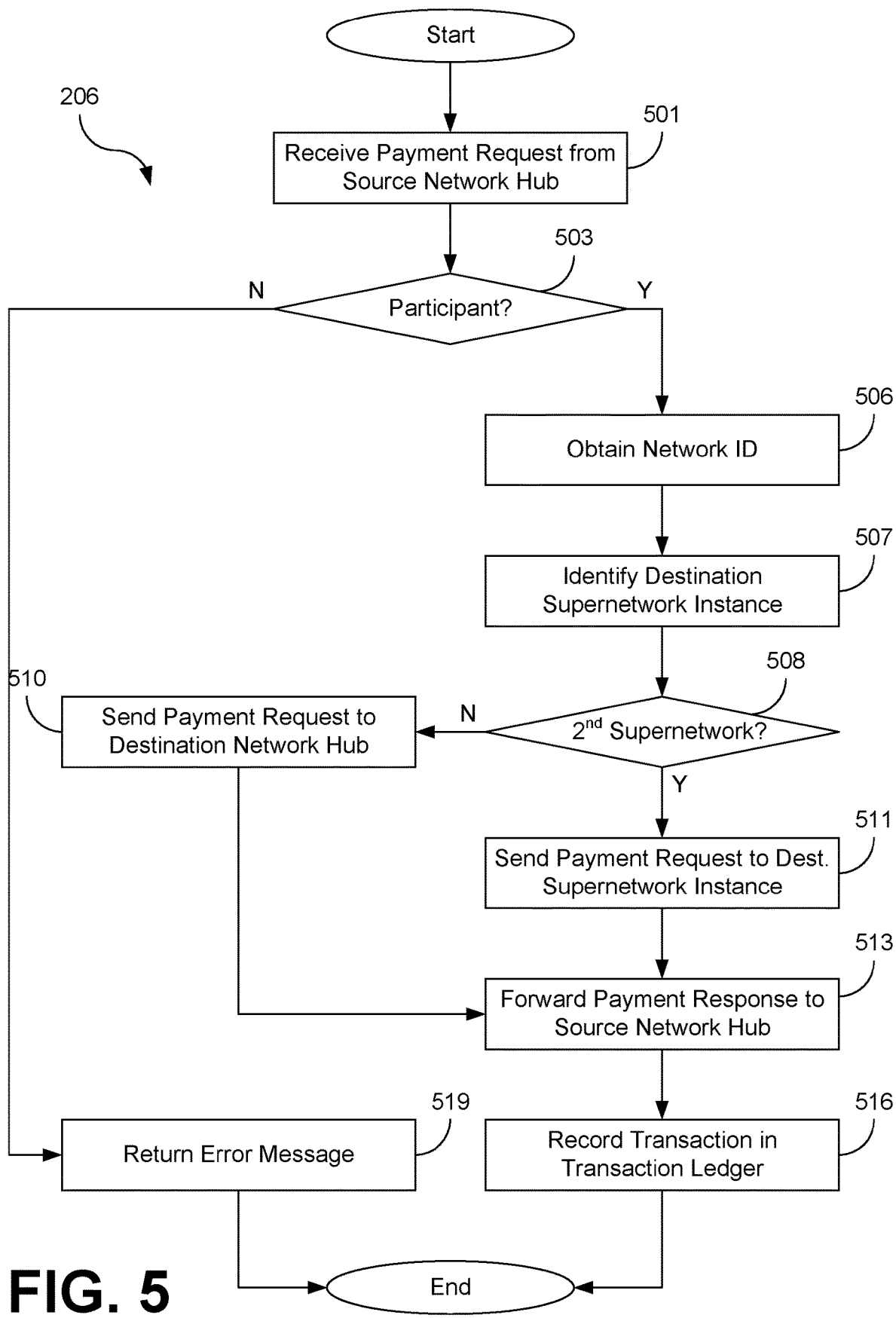
FIG. 5 is a flowchart illustrating one example of functionality implemented as portions of an application executed in a computing environment in the super network of FIG. 2 according to various embodiments of the present disclosure.

Referring next to FIG. 5, shown is a flowchart that provides one example of the operation of a portion of the global transaction router 206. The flowchart of FIG. 5 provides merely an example of the many different types of functional arrangements that can be employed to implement the operation of the depicted portion of the global transaction router 206. As an alternative, the flowchart of FIG. 5 can be viewed as depicting an example of elements of a method implemented within the supernetwork 200.

Beginning with block 501, the global transaction router 206 can receive a payment request from a source network hub 106. For example, the payment request could have been received as part of the process performed by the source network hub 106 at block 323. The payment request can include information such as the network identifier 109 and participant identifier 116 of the participant making the payment, the participant identifier 116 of the recipient, the network identifier 109 of the participant (if known), the amount of the payment, and potentially other information depending on the particular implementation of the present disclosure.

Moving on to block 503, the global transaction router 206 can determine whether the recipient of the payment request is a participant of a payment network 100 with a network hub 106 connected to a supernetwork instance 203 of the supernetwork 200. This would network hub 106 would be the destination network hub 106 for the payment request. For example, the global transaction router 206 could search the participant status cache 209 to identify a participant record 216 with a matching participant identifier 116. If a participant record 216 exists, then the process can proceed to block 506. If no participant record 216 exists, then the process can instead skip to block 516.

Then, at block 506, the global transaction router 206 can obtain the network identifier 109 for the destination network hub 106 from the participant record 216 identified at block 503.

Next, at block 507, the global transaction router 206 can identify the supernetwork instance 203 which the destination network hub 106 associated with the destination network identifier 109 obtained at block 506 is connected to. For example, the global transaction router 206 could search the RTP registration data 217 in the participant registry 211 to identify the supernetwork instance 203 that is associated with the network identifier 109. However, in some implementations, the global transaction router 206 could cache a list of network hubs 106 that it is connected to, in which case the global transaction router 206 could query its cache instead of the participant cache registry 211.

Proceeding to block 508, the global transaction router 206 can determine whether the destination network hub 106 for the payment request is connected to the supernetwork instance 203 (e.g., supernetwork instance 203a) hosting the global transaction router 206, or is connected to a second supernetwork instance 203 (e.g., supernetwork instance 203b). This can be done by determining whether supernetwork instance 203 identified at block 507 is the same supernetwork instance 203 hosting the global transaction router 206. If the destination network hub 106 is connected to the same supernetwork instance 203 that is hosting the global transaction router 206, then the process can proceed to block 510. However, if the destination network hub 106 is connected to a second supernetwork instance 203, then the process can proceed to block 511.

If the process proceeds to block 510, the global transaction router 206 can send the payment request to the destination network hub 106 that is connected to the supernetwork instance 203 hosting the global transaction router 206. The global transaction router 206 can then wait to receive a response from the destination network hub 106 regarding the payment status.

However, if the process proceeds to block 511, the global transaction router 206 can send the payment request to the global transaction router 206 hosted by the supernetwork instance 203 identified at block 509. The global transaction router 206 can then wait to receive a response from the second global transaction router 206 regarding the payment status.

Later, at block 513, the global transaction router 206 can receive a payment response indicating the status of the payment request and return or forward it to the source network hub 106. For example, the global transaction router 206 could search the participant status cache 209 to identify a participant record 216 with a matching participant identifier 116. The global transaction router 206 could then determine the network identifier 109 for the destination of the message and determine that the network identifier 109 is for a network hub 106 (e.g., the source network hub 106) connected to the supernetwork instance 203 hosting the global transaction router 206. For example, the global transaction router 206 could query the RTP registration data in participant cache registry 211 to determine that the destination network hub 106 is connected to the global transaction router 206. However, in some implementations, the global transaction router 206 could cache a list of network hubs 106 that it is connected to, in which case the global transaction router 206 could query its cache instead of the participant cache registry 211.

The global transaction router 206 can also cache or temporarily store the payment response for use at block 516.

Then, at block 516, the global transaction router 206 store or record the transaction in the transaction ledger 213. For example, if the payment response received at block 513 were a payment acceptance message, then the global transaction router 206 could record a transaction record 219 in the transaction ledger 213 containing information such as a confirmation code or number, a confirmation of the amount deposited to the account balance 119 of the recipient, a timestamp indicating the time at which the recipient received the funds, the participant identifier 116 of the source of the payment and, potentially, the network identifier 109 of the source of the payment, as well as other information. Likewise, if the payment response were a payment rejection message, then the global transaction router 206 could record a transaction record 219 in the transaction ledger 213 containing the participant identifier 116 of the source of the payment and, potentially, the network identifier 109 of the source of the payment. In some instances, the payment rejection message could include a reason why the payment was rejected, in which case the reason for the rejection could also be included in the transaction record 219. The process could then end.

If the process proceeds to block 519, the global transaction router 206 can generate and return an error message to the source network hub 106 indicating that the payment request could not be completed. In some implementations, the error message could include an indication of the problem (e.g., destination is not a member of a supported payment network 100, the supernetwork has insufficient funds at the destination, etc.). Once the error message is sent, the process can end.

Figure 6:
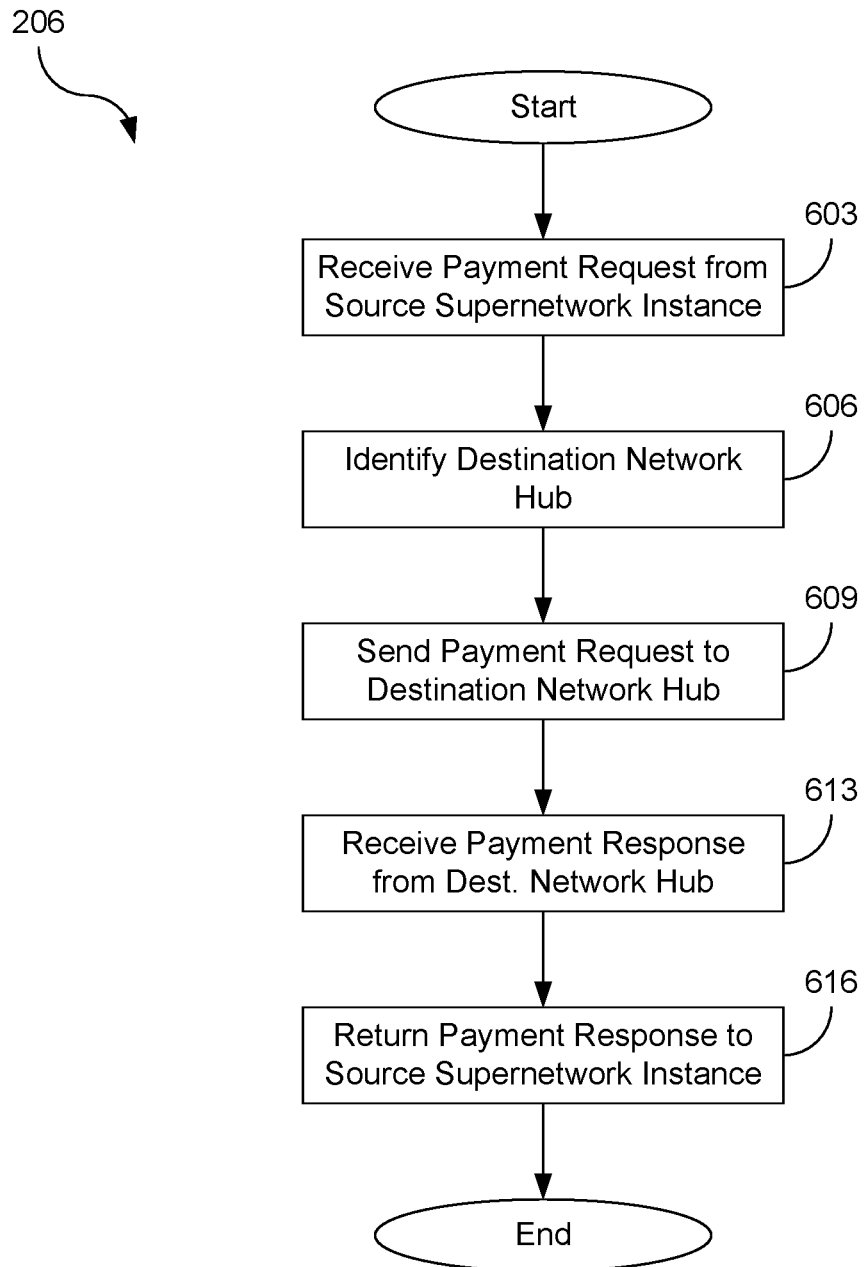
FIG. 6 is a flowchart illustrating one example of functionality implemented as portions of an application executed in a computing environment in the super network of FIG. 2 according to various embodiments of the present disclosure.

Referring next to FIG. 6, shown is a flowchart that provides one example of the operation of a portion of the global transaction router 206. The flowchart of FIG. 6 provides merely an example of the many different types of functional arrangements that can be employed to implement the operation of the depicted portion of the global transaction router 206. As an alternative, the flowchart of FIG. 6 can be viewed as depicting an example of elements of a method implemented within the supernetwork 200.

Beginning with block 603, the global transaction router 206 (e.g., global transaction router 206b) of a second supernetwork instance (e.g., supernetwork instance 203b) can receive a payment request from a first global transaction router 206 (e.g., global transaction router 206a) hosted or executed by a first supernetwork instance (e.g., supernetwork instance 203a). The payment request could be received as a result of the first global transaction router 206 determining that the second global transaction router 206 has a connection to the network hub 106 of the recipient of the payment. An example of this process has been previously discussed and illustrated by FIG. 5.

Then, at block 606, the global transaction router 206 identify the destination network hub 106. For example, the global transaction router 206 could analyze the payment request to determine the participant identifier 116 of the recipient. The global transaction router 206 could then query the participant status cache to search for a participant record 216 with a matching participant identifier 116. The global transaction router 206 could then retrieve the network identifier 109 from the participant record 216. The global transaction router 206 could then query the RTP registration data in participant cache registry 211 to determine that the destination network hub 106 is connected to the global transaction router 206. However, in some instances, the global transaction router 206 could cache a list of network hubs 106 that it is connected to, in which case the global transaction router 206 could query its cache instead of the participant cache registry 211.

Next, at block 609, the global transaction router 206 could then forward or otherwise send the payment request received at block 603 to the network hub 106 identified at block 606.

Moving on to block 613, the global transaction router 206 can receive a payment response from the destination network hub 106 that the payment request was forwarded to at block 609. The payment response, as previously discussed, could be a payment acceptance, a payment rejection, or other payment status message.

Subsequently, at block 616, the global transaction router 206 can return the payment response received at block 613 to the source supernetwork instance 203 from which the payment request was received at block 603. For example, the global transaction router 206 could search the participant status cache 209 to identify a participant record 216 with a matching participant identifier 116 specifying the source of the payment and, therefore, the destination for the payment response. The global transaction router 206 could obtain the network identifier 109 from the identified participant record 216. This could be skipped, however, in those instances where the payment response included the network identifier 109 identifying the destination of the payment response. The global transaction router 206 could then search the RTP registration data 217 in the participant registry 211 to identify the supernetwork instance 203 that is associated with the network identifier 109, and forward the payment response to the identified supernetwork instance 203. The process can subsequently end.

Figure 7:
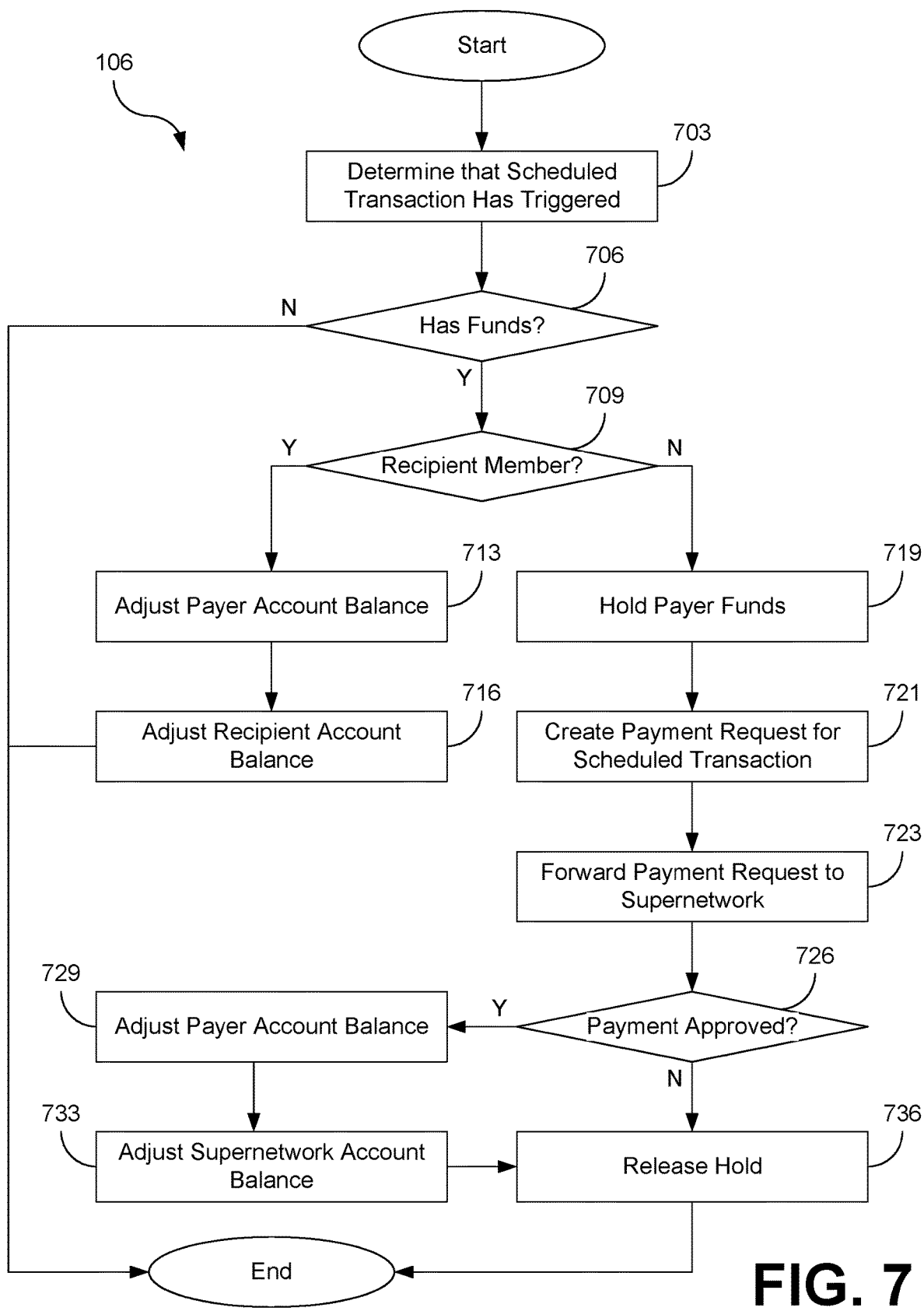
FIG. 7 is a flowchart illustrate one example of functionality implemented as portions of an application executed in the payment network of FIG. 1 according to various embodiments of the present disclosure.

Referring next to FIG. 7, shown is a flowchart that provides one example of the operation of a portion of the payment service 126. The flowchart of FIG. 7 provides merely an example of the many different types of functional arrangements that can be employed to implement the operation of the depicted portion of the payment service 126. As an alternative, the flowchart of FIG. 7 can be viewed as depicting an example of elements of a method implemented within a payment network 100.

Beginning with block 703, the payment scheduler 126 of the network hub 106 can determine that a trigger event for a scheduled transaction 123 has occurred. For example, the payment scheduler 126 could determine that a specified date and/or time has been reached. For instance, if a scheduled transaction 123 specified that the transaction should occur every Monday, then if the payment scheduler 126 determines that the current day of the week is Monday, it could conclude that the scheduled transaction 126 has been triggered. Similarly, if a scheduled transaction 123 specified that the transaction should occur on a specific date and/or specific time, then if the payment scheduler 126 determines that the current day and/or time matches the specified date and/or time, it could conclude that the scheduled transaction 126 has been triggered.

Then, at block 706, the network hub 106 can determine whether the balance 119 of the participant account 113 associated with the participant identifier 116 of the payee that created the scheduled transaction 123 has sufficient funds to settle the payment. If the balance 119 of the participant account 113 has insufficient funds to settle the payment, then the process can end. Optionally, the network hub 106 could send a rejection or error message to the participant system that created the scheduled transaction 126. However, if the balance 119 of the participant account 113 has sufficient funds, then the process can proceed to block 709.

Moving on to block 709, the network hub 106 can determine if the recipient participant system 103 identified in the scheduled transaction 1263 is a participant in the payment network 100. For example, the network hub 106 could search for a participant account 113 with a participant identifier 116 matching the participant identifier 116 specified for the recipient of the schedule transaction 123. If a matching participant account 113 is found, then the network hub 106 can determine that the recipient is member of the payment network 100 and the process can proceed to block 713. However, if a matching participant account 113 is not found, then this would indicate that the recipient participant system 103 is not a member of the payment network 100. In this situation, the process could proceed to block 719.

If the process proceeds to block 713, the network hub 106 can adjust the account balance 119 of the participant account 113 of the payer. For example, the network hub 106 could deduct an amount of funds from the account balance 119 equal to the amount of funds specified in the payment request.

Next, at block 716, the network hub 106, can similarly adjust the account balance 119 of the participant account 113 of the recipient. For example, the network hub 106 could add an amount of funds to the account balance 119 of the recipient equal to the amount of funds specified in the payment request.

However, if the process instead proceeds to block 719, the network hub 106 can place a hold on the account balance 119 of the participant account 113 of the participant system 103 of the payer that created the scheduled transaction 123. This hold can be done to prevent double-spending of funds held in the participant account 113 of the payer participant system 103 while the network hub 106 forwards the payment request to a global transaction router 206 of a supernetwork instance 203.

Subsequently, at block 721, the network hub 106 can generate a payment request based at least in part on the scheduled transaction 123. The payment request can include the transaction information, such as the amount of the transaction; the account number, participant identifier 116 and/or network identifier 109 of the payor; the account number, participant identifier 116, and/or network identifier 109 of the payee; as well as any other information that was specified in the scheduled transaction 123. They payment request can also be formatted to comply with the messaging format or protocol requirements of the supernetwork 200.

Then, at block 723, the network hub 106 can forward the payment request created at block 721 to the global transaction router 206 of the supernetwork instance 203 that the network hub 106 is connected to.

Moving on to block 326, the network hub 106 can wait until it receives a payment response message from the global transaction router 206 of the supernetwork instance 203 that the network hub 106 is connected to. Once the payment response message is received, the network hub 106 can analyze the payment response message to determine if the payment request was accepted by the recipient network hub 106 or if the payment request was rejected. If the payment response message indicates that the payment request was accepted, then the process can proceed to block 329. However, if the payment response message indicates that the payment request was rejected, then the process can skip to block 336.

If the process proceeds to block 329, the network hub 106 can adjust the payer account balance 119. For example, the network hub 106 could deduct an amount of funds from the account balance 119 equal to the amount specified in the payment request. In some instances, the payment response message could include additional transaction fees (e.g., transaction fees required by the supernetwork 200 or the recipient network hub 106 to process the payment). In these instances, the additional transaction fees could also be deducted from the account balance 119 of the participant account 113 of the payer.

Next, at block 333, the network hub 106 can adjust the account balance 119 of a participant account 113 associated with the operator of the supernetwork 200. For example, the network hub 106 could add an amount of funds equal to the amount specified in the payment request and any additional transaction fees to the account balance 119 of the participant account 113 of the supernetwork 200.

Once the process proceeds to block 336, the network hub 106 can release the hold on the account balance 119 of the participant account 113 of the payer. Then, the process could end.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

Such technologies are generally well known by those skilled in the art and, consequently, are not described in detail herein.

The flowcharts show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g., storage area networks or distributed or clustered filesystems or databases) may also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random-access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X; Y; Z; X or Y; X or Z; Y or Z; X, Y, or Z; etc.). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
a computing device comprising a processor and a memory; and
machine-readable instructions stored in the memory that, when executed by the processor, cause the computing device to at least:
determine that a trigger event has occurred for a scheduled transaction for a first payment network;
identify a network identifier for a recipient and a participant identifier for a recipient of the scheduled transaction;
determine, based at least in part on the network identifier, that the recipient of the scheduled transaction is associated with a second payment network;
generate a payment request representing the scheduled transaction, the payment request comprising the network identifier for the recipient and the participant identifier for the recipient; and
forward the payment request to a global transaction router of a supernetwork.

2. The system of claim 1, wherein the machine-readable instructions, when executed by the processor, further cause the computing device to at least:
receive a payment response for the payment request from the global transaction router, the payment response representing a payment acceptance message; and
adjust a participant account balance for a participant account of a participant system associated with a creator of the scheduled payment.

3. The system of claim 2, wherein the machine-readable instructions, when executed by the processor, further cause the computing device to at least:

send a payment acceptance message to the participant system associated with the creator of the scheduled payment.

4. The system of claim 1, wherein the machine-readable instructions, when executed by the processor, further cause the computing device to at least:
receive a payment response for the payment request from the global transaction router, the payment response representing a payment rejection message; and
send an error message to a participant system associated with a creator of the scheduled payment.

5. The system of claim 1, wherein the scheduled transaction is stored in an eventually consistent data store.

6. The system of claim 1, wherein the scheduled transaction comprises a schedule and the trigger event, wherein:
the schedule specifies the trigger event for the scheduled transaction; and
the event specifies payment information for the scheduled transaction.

7. The system of claim 1, wherein the first payment network or the second payment network is a real-time payment network.

8. A method, comprising:
determining that a trigger event has occurred for a scheduled transaction for a first payment network;
identifying a network identifier for a recipient and a participant identifier for a recipient of the scheduled transaction;
determining, based at least in part on the network identifier, that the recipient of the scheduled transaction is associated with a second payment network;
generating a payment request representing the scheduled transaction, the payment request comprising the network identifier for the recipient and the participant identifier for the recipient; and
forwarding the payment request to a global transaction router of a supernetwork.

9. The method of claim 8, further comprising:
receiving a payment response for the payment request from the global transaction router, the payment response representing a payment acceptance message; and
adjusting a participant account balance for a participant account of a participant system associated with a creator of the scheduled payment.

10. The method of claim 9, further comprising:
sending a payment acceptance message to the participant system associated with the creator of the scheduled payment.

11. The method of claim 8, further comprising:
receiving a payment response for the payment request from the global transaction router, the payment response representing a payment rejection message; and
sending an error message to a participant system associated with a creator of the scheduled payment.

12. The method of claim 8, wherein the scheduled transaction is stored in an eventually consistent data store.

13. The method of claim 8, wherein the scheduled transaction comprises a schedule and an event, wherein:
the schedule specifies the trigger event for the scheduled transaction; and
the event specifies payment information for the scheduled transaction.

14. The method of claim 8, wherein the first payment network or the second payment network is a real-time payment network.

15. A non-transitory, computer-readable medium, comprising machine-readable instructions that, when executed by a processor of a computing device, cause the computing device to at least:
determine that a trigger event has occurred for a scheduled transaction for a first payment network;
identify a network identifier for a recipient and a participant identifier for a recipient of the scheduled transaction;
determine, based at least in part on the network identifier, that the recipient of the scheduled transaction is associated with a second payment network;
generate a payment request representing the scheduled transaction, the payment request comprising the network identifier for the recipient and the participant identifier for the recipient; and
forward the payment request to a global transaction router of a supernetwork.

16. The non-transitory, computer-readable medium of claim 15, wherein the machine-readable instructions, when executed by the processor, further cause the computing device to at least:
receive a payment response for the payment request from the global transaction router, the payment response representing a payment acceptance message; and
adjust a participant account balance for a participant account of a participant system associated with a creator of the scheduled payment.

17. The non-transitory, computer-readable medium of claim 16, wherein the machine-readable instructions, when executed by the processor, further cause the computing device to at least:
send a payment acceptance message to the participant system associated with the creator of the scheduled payment.

18. The non-transitory, computer-readable medium of claim 15, wherein the machine-readable instructions, when executed by the processor, further cause the computing device to at least:
receive a payment response for the payment request from the global transaction router, the payment response representing a payment rejection message; and
send an error message to a participant system associated with a creator of the scheduled payment.

19. The non-transitory, computer-readable medium of claim 15, wherein the scheduled transaction is stored in an eventually consistent data store.

20. The non-transitory, computer-readable medium of claim 15, wherein the scheduled transaction comprises a schedule and the trigger event, wherein:
the schedule specifies the trigger event for the scheduled transaction; and
the event specifies payment information for the scheduled transaction.

* * * * *